(12) United States Patent
Hecker et al.

(10) Patent No.: US 12,036,965 B2
(45) Date of Patent: Jul. 16, 2024

(54) METHOD AND DEVICE FOR OPERATING AN ANTI-LOCK BRAKING SYSTEM CONTROL UNIT FOR A HIGHLY AUTOMATED VEHICLE WITH AT LEAST ONE STEERING AXLE

(71) Applicant: Knorr-Bremse Systeme Fuer Nutzfahrzeuge GmbH, Munich (DE)

(72) Inventors: Falk Hecker, Markgroeningen (DE); Jonas Leibbrand, Niefern-Oeschelbronn (DE); Stefan Hummel, Stuttgart (DE); Hendrik Telges, Stuttgart (DE)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 187 days.

(21) Appl. No.: 17/789,655

(22) PCT Filed: Jan. 25, 2021

(86) PCT No.: PCT/EP2021/051565
§ 371 (c)(1),
(2) Date: Jun. 28, 2022

(87) PCT Pub. No.: WO2021/151815
PCT Pub. Date: Aug. 5, 2021

(65) Prior Publication Data
US 2023/0035650 A1    Feb. 2, 2023

(30) Foreign Application Priority Data

Jan. 27, 2020 (DE) ..................... 10 2020 101 811.8

(51) Int. Cl.
| | | |
|---|---|---|
| *B60T 7/12* | (2006.01) | |
| *B60T 8/1755* | (2006.01) | |
| *B60T 13/66* | (2006.01) | |

(52) U.S. Cl.
CPC .............. *B60T 7/12* (2013.01); *B60T 8/1755* (2013.01); *B60T 13/662* (2013.01)

(58) Field of Classification Search
CPC ......... B60T 7/12; B60T 8/1755; B60T 13/662
(Continued)

(56) References Cited

U.S. PATENT DOCUMENTS

| | | |
|---|---|---|
| 3,797,892 A | 3/1974 | Leiber |
| 6,505,110 B1 | 1/2003 | Yoshino |
| 2018/0009470 A1 | 1/2018 | Meyer |

FOREIGN PATENT DOCUMENTS

| | | | |
|---|---|---|---|
| CA | 2614742 | * 6/2014 | ............... B60T 8/26 |
| CN | 101172482 A | 5/2008 | |

(Continued)

OTHER PUBLICATIONS

International Search Report for PCT/EP2021/051565 Issued May 7, 2021.

*Primary Examiner* — Hai H Huynh
(74) *Attorney, Agent, or Firm* — NORTON ROSE FULBRIGHT US LLP; Gerard A. Messina

(57) ABSTRACT

A method for operating an anti-lock braking system control unit for a highly automated vehicle with at least one steering axle, including: reading in an activation signal, which represents an activated steering brake function of the vehicle and/or a deactivated electrically actuatable steering function of the vehicle; and transmitting a control signal using the activation signal, wherein the control signal is for setting a control mode for controlling an ABS function of the anti-lock braking system control unit for at least the steering axle (Continued)

of the vehicle. Also described are a related apparatus, anti-lock braking system control unit, and computer readable medium.

19 Claims, 2 Drawing Sheets

(58) Field of Classification Search
USPC ......... 701/70, 71, 76, 77, 78, 80, 81, 82, 83
See application file for complete search history.

(56) References Cited

FOREIGN PATENT DOCUMENTS

| | | | |
|---|---|---|---|
| CN | 201587402 | U | 9/2010 |
| CN | 105984447 | A | 10/2016 |
| DE | 102004023497 | A1 | 12/2004 |
| DE | 102005029716 | A1 | 1/2007 |
| DE | 102006024617 | A1 | 11/2007 |
| DE | 102017218488 | A1 | 4/2019 |
| DE | 102018202885 | A1 | 8/2019 |
| EP | 1388472 | B1 | 12/2004 |
| EP | 2357112 | A2 | 8/2011 |
| WO | 9803384 | A1 | 1/1998 |

* cited by examiner

METHOD AND DEVICE FOR OPERATING AN ANTI-LOCK BRAKING SYSTEM CONTROL UNIT FOR A HIGHLY AUTOMATED VEHICLE WITH AT LEAST ONE STEERING AXLE

FIELD OF THE INVENTION

The present approach relates to a method and a device for operating an anti-lock braking system control unit for a highly automated vehicle with at least one steering axle, and an anti-lock braking system control unit with a device.

BACKGROUND INFORMATION

In the event of a failure of an electrically actuatable steering of a highly automated vehicle, other driving functions of the vehicle can be utilized as fallback support in order to further ensure a steering of the vehicle, for example, a steering brake function of the vehicle.

SUMMARY OF THE INVENTION

Against this background, the problem may be addressed by the present approach is to create an improved method for operating an anti-lock braking system control unit for a highly automated vehicle with at least one steering axle, an improved device for operating an anti-lock braking system control unit for a highly automated vehicle with at least one steering axle, and an improved anti-lock braking system control unit with a device.

This problem may be solved by a method for operating an anti-lock braking system control unit for a highly automated vehicle with at least one steering axle having the features of a method as described herein, by a device as described herein, by an anti-lock braking system control unit as described herein, and by a computer program and computer readable medium as described herein.

The advantages which may be achievable with the presented approach are that, in the event of a failure of an electrically actuatable steering of a highly automated vehicle, a fallback to a steering brake function is enabled, in which a harmonic steering angle for a steering axle is set.

A method for operating an anti-lock braking system control unit for a highly automated vehicle with at least one steering axle has a reading-in step and a transmission step. In the reading-in step, an activation signal is read in, which represents an activated steering brake function of the vehicle and, additionally or alternatively, a deactivated electrically actuatable steering function of the vehicle. In the transmission step, a control signal is transmitted using the activation signal or in response thereto, said control signal being configured for setting a control mode for controlling an ABS function of the anti-lock braking system control unit for at least the steering axle of the vehicle.

This method can be implemented, for example, in software or hardware or in a mixed form of software and hardware, for example, in a control unit.

The vehicle can have one or multiple steering axle(s). For example, the vehicle can be a commercial vehicle such as a truck or an articulated vehicle. Moreover, the vehicle can have at least one trailer, which can have at least one steering axle. In the case of an articulated vehicle, the tractor unit and, additionally or alternatively, the semitrailer can have at least one steering axle. The steering brake function can be a so-called "steer-by-brake" function, which can be utilized as fallback support for a failed electrically actuatable steering function. In a "steer-by-brake" function of this type, a brake pressure effectuated on individual wheels of the vehicle can advantageously result in a turn-in of the vehicle. Advantageously, in the transmission step, a control mode can be set, which is configured for harmonizing braking torques of the first wheel and of the second wheel of the steering axle in order to minimize steering torques generated in this way.

For example, in the transmission step, the control signal can be transmitted, which is configured for setting a control mode of the ABS function for at least the steering axle, in which the wheel of the steering axle or of the vehicle having a lowest ground adhesion and/or ground friction determines a brake pressure of the steering axle.

If the wheel having the lowest friction coefficient is used as a reference for setting the brake pressure, a more uniform and overall lower brake pressure can be advantageously set for the steering axle than is the case in an individual brake application of the wheels depending on, for example, only the individual ground adhesion. A turn-in process therefore takes place harmonically and a yawing moment upon a vertical axis of the vehicle remains low. A control mode of this type can also be referred to as a so-called "select low control mode." In the "select low control mode", advantageously, only one pressure control valve can be utilized per axle. As mentioned above, the wheel having the lower coefficient of friction is always decisive for the actuation under split-p conditions, i.e., when there is a different surface for the right wheel and the left wheel of the steering axle, for example, snow and asphalt.

Moreover, the method can include an actuation step in which a valve synchronous operation signal is output in response to the activation signal, which is configured for effectuating an actuation of at least two pneumatic control valves of an anti-lock braking system in a synchronous operation. In this way, it can be ensured that the resultant brake pressures actually progress equally and, therefore, a turn-in, for example, at one or multiple steering axle(s) of the vehicle, takes place in a harmonic manner. The pneumatic control valves can be pressure control valves, or PCVs.

It is also advantageous when the method includes a limiting step in which a limitation signal is output in response to the activation signal, which is configured for limiting a maximum pressure build-up gradient for a pneumatic valve at at least the steering axle. This enables a simultaneous and, thus, harmonic build-up of brake pressure at both wheels of the steering axle. Here, the limitation signal can be configured for effectuating the maximum pressure build-up gradient within a certain period of time of a braking operation, for example, at the beginning of the braking operation.

According to one embodiment, the method can also include a reduction step in which a reduction signal is output in response to the activation signal, which is configured for reducing a target slip value for the ABS function at at least the steering axle. In this way as well, a turn-in process can take place in a harmonic manner.

The method can also include a setting step in which a first target slip signal is output in response to the activation signal, which is configured for setting a first target slip value for the first wheel of the steering axle, and a second target slip signal is output, which is configured for setting a second target slip value for the second wheel of the steering axle, which differs from the first target slip value. This permits an intentional induction of a steering torque.

The method can include an output step in which a rear axle signal is output in response to the activation signal and using a steering signal, which represents a steering torque at the steering axle, the rear axle signal being configured for setting a braking force at at least a rear axle of the vehicle. The steering torque can be a predetermined steering torque, which announces, for example, an impending yaw of the vehicle. Here, a rear axle signal can be output, which is configured for setting a braking force, which is configured for preventing a yaw of the vehicle. This enables a balancing of the braking force at the rear axle such that the arising yawing moment, for example, is thus precisely compensated for by the steering torque at the steering axle. Advantageously, due to the activation signal, a braking distance of the vehicle can be shortened as compared with only a set select low control.

The approach presented here furthermore provides a device which is configured for carrying out, controlling, or implementing the steps of a variant of a method presented here in corresponding units. The object of the approach may also be rapidly and efficiently achieved with the aid of this embodiment variant of the approach in the form of a device.

For this purpose, the device can include at least one processing unit for processing signals or data, at least one memory unit for storing signals or data, at least one interface to a sensor or an actuator for reading in sensor signals from the sensor or for outputting data or control signals to the actuator and/or at least one communication interface for reading in or outputting data which are embedded in a communication protocol. The processing unit can be, for example, a signal processor, a microcontroller, or the like, wherein the memory unit can be a flash memory, an EPROM, or a magnetic memory unit. The communication interface can be configured for reading in or outputting data in a wireless and/or wire-bound manner, wherein a communication interface, which can read in or output wire-bound data, can read in these data, for example, electrically or optically from a corresponding data transmission line or output these data into a corresponding data transmission line.

In the present case, a device can be understood to be an electrical device that processes sensor signals and, as a function thereof, outputs control and/or data signals. The device can include an interface, which may be in the form of hardware and/or software. In the case of a hardware configuration, the interfaces can be part of a so-called system ASIC, for example, which contains highly diverse functions of the device. It is also possible, however, that the interfaces are standalone, integrated circuits or are formed, at least in part, from discrete components. In the case of a software configuration, the interfaces can be software modules, which are present, for example, on a microcontroller in addition to other software modules.

An anti-lock braking system control unit includes the above-described device and is configured for use for a highly automated vehicle with at least one steering axle. The device can be connected to the anti-lock braking system control unit for signal transmission or implemented into the anti-lock braking system control unit.

Exemplary embodiments of the approach presented here are explained in greater detail in the following description with reference to the figures.

In the following description of favorable exemplary embodiments of the present approach, identical or similar reference numerals are used for the similarly functioning elements represented in the different figures, wherein a repeated description of these elements is dispensed with.

DETAILED DESCRIPTION

Figure 1:
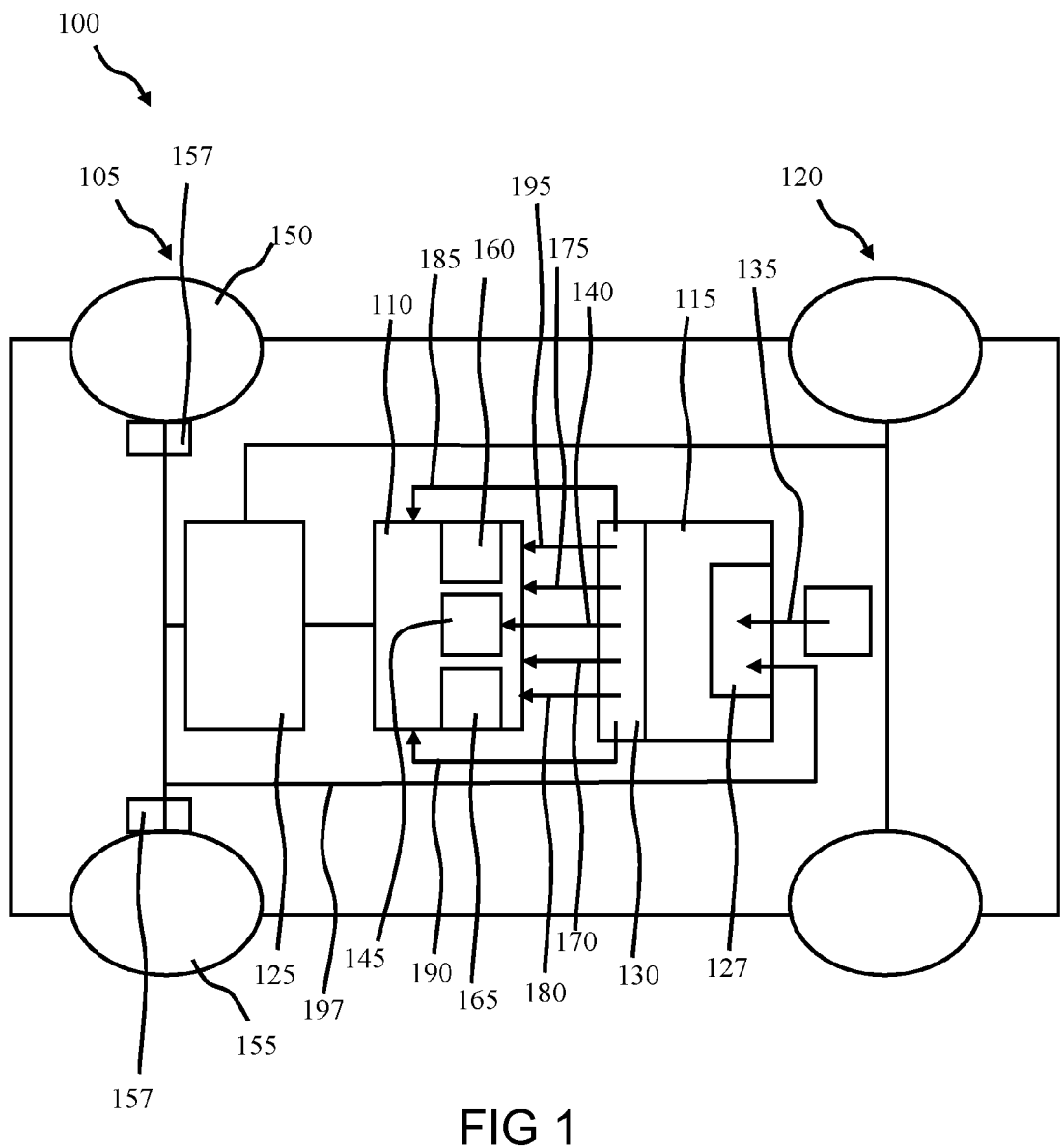
FIG. 1 shows a schematic representation of a highly automated vehicle with at least one steering axle and an anti-lock braking system control unit and with a device for operating the anti-lock braking system control unit according to one exemplary embodiment.

FIG. 1 shows a schematic representation of a highly automated vehicle 100 with at least one steering axle 105 and an anti-lock braking system control unit 110 and with a device 115 for operating the anti-lock braking system control unit 110 according to one exemplary embodiment. A view of the vehicle 100 from above is shown.

The highly automated vehicle 100 is configured, according to this exemplary embodiment, as a highly automated commercial vehicle with two axles 105, 120. In addition to the steerable steering axle 105, the vehicle 100 according to this exemplary embodiment has a rear axle 120. The steering axle 105 is, according to this exemplary embodiment, the front axle of the vehicle 100. According to one exemplary embodiment, the rear axle 120 is also configured as a steerable steering axle 105, or the vehicle 100 has, according to one alternative exemplary embodiment, at least one further steerable steering axle 105.

The vehicle 100 has, according to this exemplary embodiment, an anti-lock braking system 125 and the anti-lock braking system control unit 110 for controlling the anti-lock braking system 125. The device 115 is configured for operating the anti-lock braking system control unit 110. Merely by way of example, the device 115 according to this exemplary embodiment is accommodated at or in the vehicle 100. Here, the device 115 according to this exemplary embodiment is connected to the anti-lock braking system control unit 110 for signal transmission or is implemented into the anti-lock braking system control unit 110.

The device 115 includes a read-in unit 127 and a transmitting unit 130. The read-in unit 127 is configured for reading in an activation signal 135, which represents an activated steering brake function of the vehicle 100 and/or a deactivated electrically actuatable steering function of the vehicle 100. The transmitting unit 130 is configured for transmitting a control signal 140 in response to the activation signal 135, the control signal 140 being configured for setting a control mode 145 for controlling an ABS function of the anti-lock braking system control unit 110 for at least the steering axle 105 of the vehicle 100.

According to this exemplary embodiment, the read-in unit 127 is configured for reading in the activation signal 135, which indicates an activated "steer-by-brake" function as the activated steering brake function, which, according to this exemplary embodiment, is activated merely as fallback support for a failed electrically actuatable steering function of the vehicle 100.

According to this exemplary embodiment, the transmitting unit 130 is configured for setting the control mode 145, which is configured for harmonizing braking torques of the first wheel 150 and of the second wheel 155 of the steering axle 105 in order to minimize steering torques generated in this way. For this purpose, the transmitting unit 130 according to this exemplary embodiment is configured for transmitting the control signal 140, which is configured for setting a control mode 145 in which the wheel 150, 155 of the steering axle 105 of the vehicle 100 having a lowest ground adhesion determines a brake pressure of the steering axle 105. This control mode 145 can also be referred to as the "select low control mode" 145. According to this exemplary embodiment, only one pressure control valve is utilized per axle 105, 120 in the select low control mode 145. According to this exemplary embodiment, the anti-lock braking system control unit 110 includes settable further control modes 160, 165 in the form of an "individual control" 160 and a "modified individual control" 165.

When "individual control" 160 is set, an optimal brake pressure is regulated for each wheel 150, 155 of the steering axle 105, the brake pressure effectuating, via a pneumatic valve 157 in each case, an application of the brake at the particular associated wheel 150, 155. The shortest braking distances are achieved in this way. Under split-p conditions, however, a high yawing moment arises. The vehicle 100 then becomes more difficult to handle. When "modified individual control" 165 is set, one pressure control valve is utilized for each wheel 150, 155 of the steering axle 105. A brake pressure difference between the right front wheel 150 and the left front wheel 155 is limited to a permissible extent. This yields a slightly longer braking distance than in the case of the individual control 160, although the yawing moment is reduced and the vehicle 100 remains easy to handle also in the case of critical braking maneuvers. These two further control modes 160, 165 are not set, however, in the presence of the activation signal 135.

According to this exemplary embodiment, the transmitting unit 130 is configured for also outputting a valve synchronous operation signal 170, a limitation signal 175, a reduction signal 180, a first target slip signal 185, a second target slip signal 190, and/or a rear axle signal 195 in response to the activation signal 135.

The valve synchronous operation signal 170 is configured for effectuating an actuation of at least two pneumatic control valves of the anti-lock braking system 125 in a synchronous operation. The limitation signal 175 is configured for limiting a maximum pressure build-up gradient at at least the steering axle 105. According to one exemplary embodiment, the limitation signal 175 is configured for effectuating the maximum pressure build-up gradient within a certain period of time of a braking operation, according to this exemplary embodiment within a certain period of time at the beginning of the braking operation.

The reduction signal 180 is configured for reducing a target slip value for the ABS function at at least the steering axle 105. The first target slip signal 185 is configured for setting a first target slip value for the first wheel 150 of the steering axle 105 and the second target slip signal 190 is configured for setting a second target slip value for the second wheel 155 of the steering axle 105, which differs from the first target slip value.

The transmitting unit 130 is configured for outputting the rear axle signal 195 in response to the activation signal 135 and using a steering signal 197, which represents a steering torque at the steering axle 105, the rear axle signal 195 being configured for setting a braking force at at least the rear axle 120 of the vehicle 100. Here, according to one exemplary embodiment, a rear axle signal 195 is output, which is configured for setting a braking force, which is configured for preventing a yaw of the vehicle 100. The steering signal 197 represents, according to this exemplary embodiment, a predetermined steering torque at the steering axle 105. According to this exemplary embodiment, the device 115 is configured for reading in the activation signal 135 from a driver assistance system of the vehicle 100. Moreover, the device 115 is configured, according to this exemplary embodiment, for reading in the steering signal 197 from a sensor, an evaluation unit, or the anti-lock braking system control unit 110. The device 115 is configured for outputting the valve synchronous operation signal 170, the limitation signal 175, the reduction signal 180, the first target slip signal 185, the second target slip signal 190, and/or the rear axle signal 195 to the anti-lock braking system control unit 110 or the anti-lock braking system 125.

The device 115 presented here advantageously implements an ABS control method for the "steer-by-brake" steering brake function as steering redundancy. One objective of the device 115 is to represent, in the most optimal manner possible, the "steer-by-brake" steering brake function, for example, as fallback support for an electrically actuatable steering during highly automated driving, also in the case that the vehicle 100 is decelerated and even under difficult friction conditions.

In contrast to the method presented here using the device 115, when brakes are applied at individual wheels 150, 155, the physical effect arises—as redundancy support for the transverse guidance—that the brake application at an individual front wheel 150, 155 generates a steering torque, which, in connection with a positive scrub radius, results in a turning-in of the wheels 150, 155. This also functions, when both wheels 150, 155 have already been decelerated, by an appropriate differential pressure being built up between the left wheel 150 and the right wheel 155, which effectuates the same effect as one-sided braking. Unfortunately, a steering effect of this type also results for the case in which, during a braking operation with different friction coefficients on the left and the right, which is also referred to as "split-p", the wheels 150, 155 are decelerated by ABS with different intensities and, in fact, during driving straight ahead as well as during cornering. This is the normal control behavior of ABS when both wheels 150, 155 are assigned to a separate control duct, for example, during the individual control or modified individual control.

A fundamental advantage of the device 115 is that the braking system—when it takes over the steering function in the event of failure of the electrically actuatable steering by steer-by-brake, also referred to as the "SBB function"—switches the ABS controller at least at the steering axle 105 into the select low control mode 145 (or the like) in order to harmonize the braking torques on the left and the right and, thus, minimize the induced steering torques. As a result, for example, during deceleration at different friction coefficients, the build-up of a steering torque is avoided or at least considerably damped, and so the SBB function can continue to control the vehicle 100.

According to this exemplary embodiment, the SBB function in the vehicle 100 with one or also multiple steering axle(s) 105 in the form of steered front axles instructs, as soon as it is activated, the ABS function to switch the front axle(s) 105 to the select low control mode 145 (or the like).

Additional options are individually or in any combination:
Actuating the pneumatic control valves for ABS, for example, PCVs, in a synchronous operation, so that the resulting brake pressures actually proceed identically.
Limiting the pressure build-up gradient at the beginning of a braking operation, according to this exemplary embodiment, in particular at the steering axle(s) 105 and/or the rear axle 120 or another non-steered axle, in order to prevent high steering torques from arising here as well.

Reducing the target slip value for the ABS regulation at the steering axle 105 in order to further reduce possible steering torques, for example, due to a different braking behavior on the left and on the right, and to be able to more easily apply a steering torque at an axle by increasing the target slip value.

Intentionally inducing a steering torque due to different target slip values on the right and the left in order to laterally control the vehicle 100.

Balancing the braking force at the rear axle 120 in such a way that the arising yawing moment can be compensated for specifically by the steering torque at the steering axle 105. As a result, the braking distance can be reduced as compared to a pure select low regulation.

Figure 2:
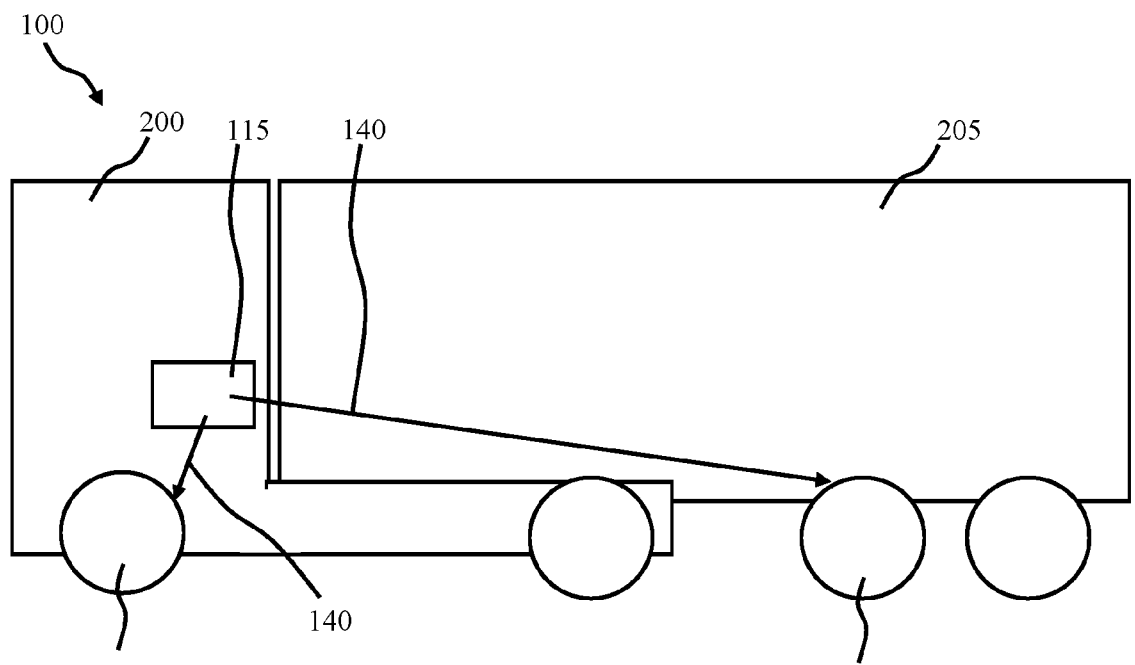
FIG. 2 shows a schematic lateral representation of a vehicle with a device according to one exemplary embodiment.

FIG. 2 shows a schematic lateral representation of a vehicle 100 with a device 115 according to one exemplary embodiment. This can be an exemplary embodiment of the vehicle 100 with the device 115 described with reference to FIG. 1.

The vehicle 100 is configured, according to this exemplary embodiment, as an articulated vehicle with a tractor unit 200 and/or a semitrailer 205. According to this exemplary embodiment, the tractor unit 200 and/or the semitrailer 205 have/has at least one or multiple steering axle(s) 105. The device 115 is configured, according to this exemplary embodiment, for outputting control signals 140 to one or multiple anti-lock braking system control unit(s) of the articulated vehicle in order to set the control mode for multiple or all steering axles 105 of the articulated vehicle.

The device 115 is accommodated, according to this exemplary embodiment, in or on the tractor unit 200. According to one alternative exemplary embodiment, the device 115 is accommodated in or on the semitrailer 205, or the semitrailer 205 has a further device 115 corresponding to the device 115.

Figure 3:
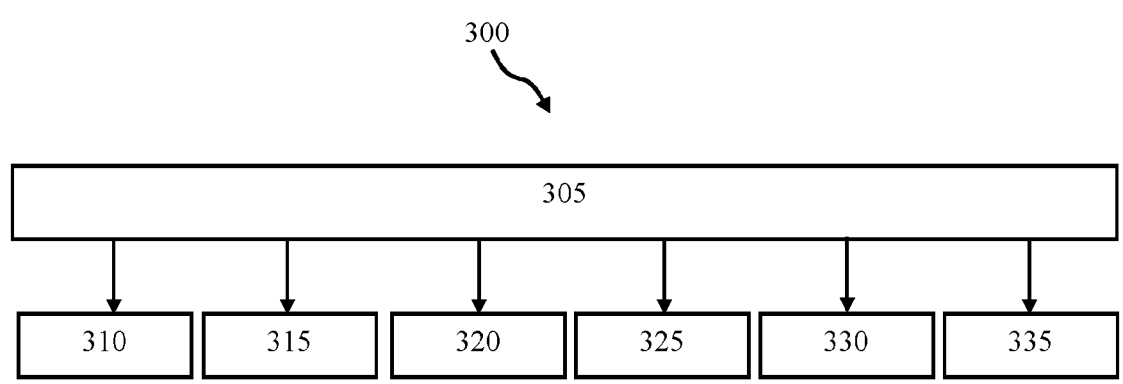
FIG. 3 shows a flowchart of a method for operating an anti-lock braking system control unit for a highly automated vehicle with at least one steering axle according to one exemplary embodiment.

FIG. 3 shows a flowchart of a method 300 for operating an anti-lock braking system control unit for a highly automated vehicle with at least one steering axle according to one exemplary embodiment. This can be the anti-lock braking system control unit described in FIG. 1 or FIG. 2. The method 300 is implementable or actuatable by the device described in FIG. 1 or FIG. 2.

The method 300 includes a reading-in step 305 and a transmission step 310. In the reading-in step 305, an activation signal is read in, which represents an activated steering brake function of the vehicle and/or a deactivated electrically actuatable steering function of the vehicle. In the transmission step 310, a control signal is transmitted in response to the activation signal, said control signal being configured for setting a control mode for controlling an ABS function of the anti-lock braking system control unit for at least the steering axle of the vehicle.

Optionally, the method 300 according to this exemplary embodiment includes an activation step 315, a limiting step 320, a reduction step 325, a setting step 330, and/or an output step 335. In the activation step 315, a valve synchronous operation signal is output in response to the activation signal, which is configured for effectuating an actuation of at least two pneumatic control valves of an anti-lock braking system in a synchronous operation. In the limiting step 320, a limitation signal is output in response to the activation signal, which is configured for limiting a maximum pressure build-up gradient at at least the steering axle. In the reduction step 325, a reduction signal is output in response to the activation signal, which is configured for reducing a target slip value for the ABS function at at least the steering axle. In the setting step 330, a first target slip signal is output in response to the activation signal, which is configured for setting a first target slip value for the first wheel of the steering axle, and a second target slip signal is output, which is configured for setting a second target slip value for the second wheel of the steering axle, which differs from the first target slip value. In the output step 335, a rear axle signal is output in response to the activation signal and using a steering signal, which represents a steering torque at the steering axle, the rear axle signal being configured for setting a braking force at at least a rear axle of the vehicle.

The method steps presented here may be repeated and may be carried out in a sequence other than that described.

If an exemplary embodiment includes an "and/or" linkage between a first feature and a second feature, this is intended to be read that the exemplary embodiment according to one specific embodiment includes both the first feature and the second feature and, according to a further specific embodiment, includes either only the first feature or only the second feature.

THE LIST OF REFERENCE NUMERALS IS AS FOLLOWS

100 highly automated vehicle
105 steering axle
110 anti-lock braking system control unit
115 device
120 rear axle
125 anti-lock braking system
127 read-in unit
130 transmitting unit
135 activation signal
140 control signal
145 control mode
150 first wheel
155 second wheel
157 pneumatic valve
160 individual control
165 modified individual control
170 valve synchronous operation signal
175 limitation signal
180 reduction signal
185 first target slip signal
190 second target slip signal
195 rear axle signal
197 steering signal
200 tractor unit
205 semitrailer
300 method for operating an anti-lock braking system control unit for a highly automated vehicle with at least one steering axle
305 reading-in step
310 transmission step
315 activation step
320 limiting step
325 reduction step
330 setting step
335 output step

The invention claimed is:

1. A method for operating an anti-lock braking system control unit for an automated vehicle with at least one steering axle, the method comprising:
   reading in an activation signal, which represents an activated steering brake function of the vehicle and/or a deactivated electrically actuatable steering function of the vehicle; and transmitting a control signal using the activation signal, wherein the control signal is for setting a control mode for controlling an ABS function of the anti-lock braking system control unit for at least the steering axle of the vehicle;

wherein the control mode is configured for providing smooth steering via an ABS braking event in case of a malfunction of the main steering actuator.

2. The method of claim 1, wherein in the transmission, the control signal is transmitted, which is for setting a control mode of the ABS function for at least the steering axle, in which the wheel of the steering axle or of the vehicle having a lowest ground adhesion and/or ground friction determines a brake pressure of the steering axle.

3. The method of claim 1, further comprising:
performing an actuation in which a valve synchronous operation signal is output in response to the activation signal, which is for effectuating an actuation of at least two pneumatic control valves of an anti-lock braking system in a synchronous operation.

4. The method of claim 1, further comprising:
performing a limiting in which a limitation signal is output in response to the activation signal, which is for limiting a maximum pressure build-up gradient for a pneumatic valve at at least the steering axle.

5. The method of claim 1, further comprising:
performing a reduction in which a reduction signal is output in response to the activation signal, which is for reducing a target slip value for the ABS function at at least the steering axle.

6. The method of claim 1, further comprising:
performing a setting in which a first target slip signal is output in response to the activation signal, which is for setting a first target slip value for the first wheel of the steering axle, and a second target slip signal is output, which is for setting a second target slip value for the second wheel of the steering axle, which differs from the first target slip value.

7. The method of claim 1, further comprising:
performing an outputting in which a rear axle signal is output in response to the activation signal and using a steering signal, which represents a steering torque at the steering axle, the rear axle signal being for setting a braking force at at least a rear axle of the vehicle.

8. The method of claim 1, wherein the activation signal indicates an activated steer-by-brake function as the activated steering brake function, which is activated for a failed electrically actuatable steering function of the vehicle.

9. The method of claim 1, wherein the braking torques of a first wheel and a second wheel of the at least one steering axle are harmonized to reduce steering torques.

10. An apparatus for operating an anti-lock braking system control unit for an automated vehicle having at least one steering axle, comprising:
a device configured to perform the following:
reading in an activation signal, which represents an activated steering brake function of the vehicle and/or a deactivated electrically actuatable steering function of the vehicle; and
transmitting a control signal using the activation signal, wherein the control signal is for setting a control mode for controlling an ABS function of the anti-lock braking system control unit for at least the steering axle of the vehicle;
wherein the control mode is configured for providing smooth steering via an ABS braking event in case of a malfunction of the main steering actuator.

11. The apparatus of claim 10, wherein the activation signal indicates an activated steer-by-brake function as the activated steering brake function, which is activated for a failed electrically actuatable steering function of the vehicle.

12. The apparatus of claim 10, wherein the braking torques of a first wheel and a second wheel of the at least one steering axle are harmonized to reduce steering torques.

13. An anti-lock braking system control unit, for an automated vehicle having at least one steering axle, comprising:
a device configured to perform the following:
reading in an activation signal, which represents an activated steering brake function of the vehicle and/or a deactivated electrically actuatable steering function of the vehicle; and
transmitting a control signal using the activation signal, wherein the control signal is for setting a control mode for controlling an ABS function of the anti-lock braking system control unit for at least the steering axle of the vehicle;
wherein the control mode is configured for providing smooth steering via an ABS braking event in case of a malfunction of the main steering actuator.

14. The anti-lock braking system control unit of claim 13, wherein the activation signal indicates an activated steer-by-brake function as the activated steering brake function, which is activated for a failed electrically actuatable steering function of the vehicle.

15. The anti-lock braking system control unit of claim 13, wherein the braking torques of a first wheel and a second wheel of the at least one steering axle are harmonized to reduce steering torques.

16. A non-transitory computer readable medium having a computer program, which is executable by a processor, comprising:
a program code arrangement having program code for operating an anti-lock braking system control unit for an automated vehicle with at least one steering axle, by performing the following:
reading in an activation signal, which represents an activated steering brake function of the vehicle and/or a deactivated electrically actuatable steering function of the vehicle; and
transmitting a control signal using the activation signal, wherein the control signal is for setting a control mode for controlling an ABS function of the anti-lock braking system control unit for at least the steering axle of the vehicle;
wherein the control mode is configured for providing smooth steering via an ABS braking event in case of a malfunction of the main steering actuator.

17. The computer readable medium of claim 16, wherein in the transmission, the control signal is transmitted, which is for setting a control mode of the ABS function for at least the steering axle, in which the wheel of the steering axle or of the vehicle having a lowest ground adhesion and/or ground friction determines a brake pressure of the steering axle.

18. The computer readable medium of claim 16, wherein the braking torques of a first wheel and a second wheel of the at least one steering axle are harmonized to reduce steering torques.

19. The computer readable medium of claim 16, wherein the activation signal indicates an activated steer-by-brake function as the activated steering brake function, which is activated for a failed electrically actuatable steering function of the vehicle.

\* \* \* \* \*